(12) United States Patent
Baumgardner et al.

(10) Patent No.: US 6,228,909 B1
(45) Date of Patent: May 8, 2001

(54) ASPHALT COMPOSITIONS AND METHODS OF PREPARATION THEREOF

(75) Inventors: Gaylon L. Baumgardner, Jackson; Martin R. Burrow, Brandon, both of MI (US)

(73) Assignee: Ergon, Incorporated, Jackson, MS (US)

(*) Notice: Subject to any disclaimer, the term of this patent is extended or adjusted under 35 U.S.C. 154(b) by 0 days.

(21) Appl. No.: 09/474,937

(22) Filed: Dec. 30, 1999

Related U.S. Application Data

(63) Continuation of application No. 08/829,163, filed on Mar. 31, 1997.

(51) Int. Cl.[7] .................................................. C08K 5/01

(52) U.S. Cl. ........................ 524/62; 524/64; 524/417

(58) Field of Search .............................. 524/62, 64, 417

(56) References Cited

U.S. PATENT DOCUMENTS 4,882,373 * 11/1989 Moran ................................ 524/68

* cited by examiner

*Primary Examiner*—Edward J. Cain
(74) *Attorney, Agent, or Firm*—Nilles & Nilles, S.C.

(57) ABSTRACT

Systems and methods for combining a mineral acid and a polymer additive in an asphalt composition are described. Methods of preparing a polymer modified asphalt include providing a source of a neat asphalt; heating the neat asphalt; providing a source of a polymer; adding the polymer to the neat asphalt to form a blend; providing a source of a dilution asphalt; and adding the blend to the dilution asphalt to form a diluted product. The systems and methods provide advantages in that the addition of the mineral acid widens the temperature range in which satisfactory performance from a given polymer asphalt composition can be achieved or, as a corollary, reduces the amount of polymer additive that would otherwise be needed to achieve satisfactory performance within a given temperature range.

34 Claims, 1 Drawing Sheet

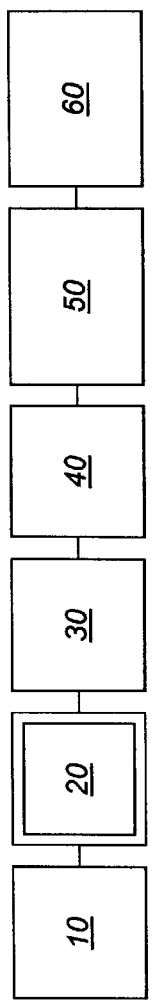
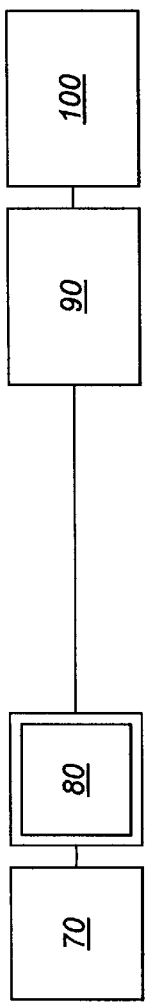
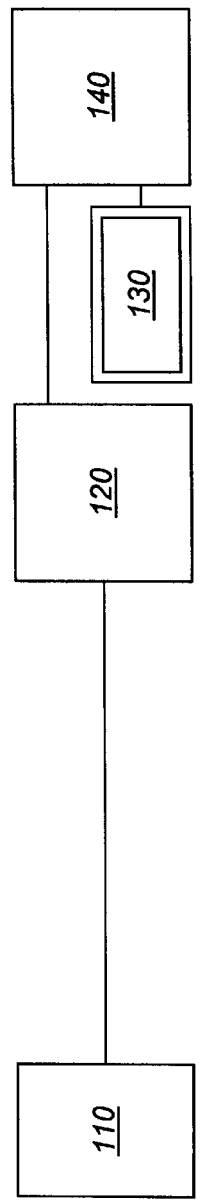
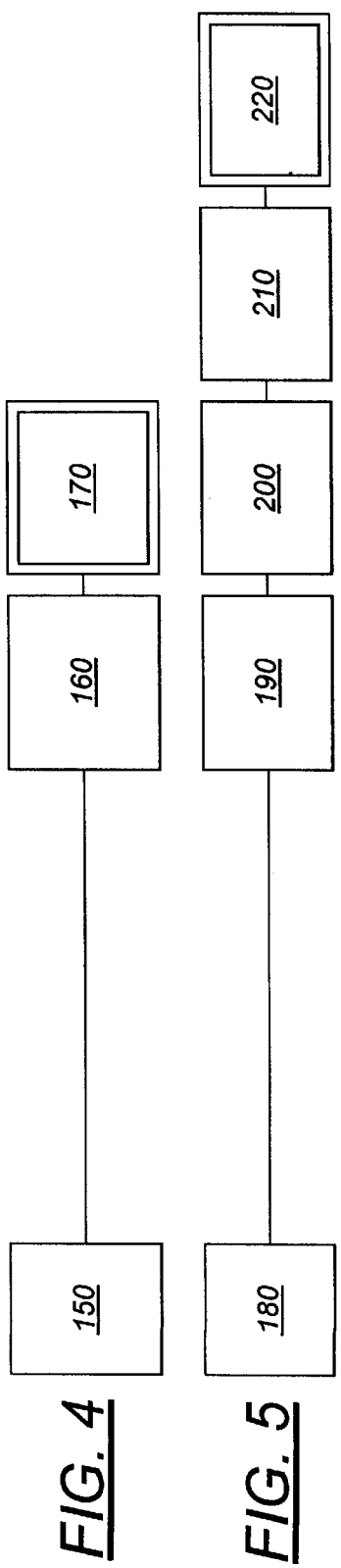

ASPHALT COMPOSITIONS AND METHODS OF PREPARATION THEREOF

This application is a continuation of application Ser. No. 08/829,163, filed Mar. 31, 1997.

BACKGROUND OF THE INVENTION

1. Field of the Invention

The present invention relates generally to the field of asphalt compositions and various methods for the preparation of these compositions. More particularly, the present invention relates to asphalt compositions whose preparation includes the addition, at specific times, of both a polymer and a source of polyphosphoric acid. The present invention thus relates to an asphalt composition of the type that can be termed polymer modified.

2. Discussion of the Related Art

Historically, polymers have been added to asphalt compositions. Prior art polymer asphalts of the type hereunder consideration, sometimes called polymer modified asphalts, are well-known to those skilled in the art. A conventional polymer modified asphalt is typically based on the addition of thermoplastic elastomer to the asphalt. The polymer improves the performance of the asphalt. However, polymer additives are relatively expensive. Thus, a previously recognized problem has been that polymer modified asphalts are costly.

In the past, mineral acids have been added to asphalt compositions. Prior art acid containing asphalts of the type hereunder consideration, sometimes called acid modified asphalts, are also well-known to those skilled in the art. A conventional acid modified asphalt is typically based on the addition of a mineral acid to an air blown asphalt. For example, polyphosphoric acid (i.e., $H_{n+2}P_nO_{3n+1}$, where n>1) can be added to air blown asphalt in the form of phosphorus pentoxide (i.e., $P_2O_5$). The acid improves the low temperature performance of the air blown asphalt. A previously recognized problem has been that adding polyphosphoric acid to air-blown asphalt yields a trade-off between properties.

Oil refineries are designed to refine specific types of crude oils. A refinery designed to refine light sweet crude would not be able to efficiently refine a heavy crude, if at all. The heavy crudes do not require as severe processing as do the light crudes.

Sweet and sour crudes are so defined based on the percentage of sulfur contained in the crude. The breaking point between sweet and sour crudes is not well defined, but generally less than 2 weight percent is considered to be sweet, while greater than 2 weight percent is considered to be sour. The majority of the sulfur in the crude remains in the highest boiling point fraction or the bottom residuum, the asphalt. Since a light sweet crude might yield only 15% asphalt, and a heavy sour crude might yield 50% asphalt, the asphalt from the light sweet crude may actually contain a larger percentage of sulfur.

Heavy and light crudes are so defined based on the API gravity or specific gravity of the crude. The API gravity and specific gravity are related by the following equation, S.G.= (141.5)/(131.5+API) where the higher the API, the lower the S.G. High API gravities are indicative of light crudes, while low API gravities are indicative of heavy crudes. The breaking point between heavy and light crudes is not well defined, but generally an API gravity less than 25 is considered to be heavy, while an API gravity greater than 25 is considered to be light.

An aromatic compound is described as those compounds having physical and chemical properties resembling those of benzene. A naphthenic compound is described as those compounds having physical and chemical properties resembling those of cyclopentane, cyclohexane, cycloheptane, or other naphthenic homologs derived from petroleum. Generally, the breaking point between aromatic and naphthenic asphalts is considered to be 70% cyclics from an Iatroscan analysis. Greater than 70% cyclics is considered to be aromatic, while less than 60% is considered to be naphthenic.

The Strategic Highway Research Program (SHRP) was established in 1987 to improve the performance and durability of United States roads and to make those roads safer for both motorists and highway workers. One of the results of SHRP was the development of the Superior Performing Asphalt Pavements (SUPERPAVE™) specifications for asphalts. The SUPERPAVE™ system specifies materials characterization techniques and results thereof for the performance certification of asphalt within temperature ranges (e.g., 70–22:from +70° C. to –22° C.). By specifying the acceptable limits for the characterization results, rather than any particular composition, the SUPERPAVE™ specifications are material independent. Thus, an end user can require that an asphalt meet a particular SUPERPAVE™ specification and be reasonably confident that an installed asphalt will perform satisfactorily, without regard to the specific crude oil source or other compositional parameters, thereby controlling rutting, low temperature cracking and fatigue cracking. Thus, a recently recognized need has developed for compositions and methods that meet the SUPERPAVE™ specifications consistently and efficiently.

SUMMARY AND OBJECTS OF THE INVENTION

By way of summary, the present invention is directed to asphalts into which both polyphosphoric acid and a polymer are added and methods for the addition of these components, with special regard to the time period during which these components are introduced. Effects of the present invention, which are substantial improvements, are to widen the temperature range in which satisfactory performance from a given asphalt composition can be achieved or, as a corollary, reduce the amount of polymer additive that would otherwise be needed to achieve satisfactory performance within a given temperature range.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which:

FIG. 1 illustrates a block schematic view of a first process according to the present invention;

FIG. 2 illustrates a block schematic view of a second process according to the present invention;

FIG. 3 illustrates a block schematic view of a third process according to the present invention;

FIG. 4 illustrates a block schematic view of a fourth process according to the present invention; and FIG. 5 illustrates a block schematic view of a fifth process according to the present invention.

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

Referring to FIG. 1, in a first method a neat asphalt undergoes a step of heating 10. While the neat asphalt is hot, a mineral acid is introduced at an acid step 20. A step of mixing 30 is then carried out for a period of time of from approximately one to approximately two hours. A further step of heating 40 to approximately 300° F.–400° F. then follows. A blend is then made at a polymer step 50 by the addition of at least one polymer. The resulting blend is then added to a dilution asphalt at a step 60.

Referring now to FIG. 2, in a second method a neat asphalt undergoes a step of heating 70. A mineral acid is then added to the neat asphalt at an acid step 80. Then, a blend is made by the addition of at least one polymer at a polymer step 90. The blend is then added to a dilution asphalt at a step 100.

Referring now to FIG. 3, in a third method a neat asphalt undergoes a step of heating 110. A blend is then prepared by the introduction of at least one polymer at a polymer step 120. Meanwhile, a mineral acid is added to a dilution asphalt at an acid step 130. The blend is added to the acid dilution asphalt mixture at a step 140.

Referring now to FIG. 4, in a fourth method a neat asphalt undergoes a step of heating 150. A blend is then prepared by adding at least one polymer to the heated neat asphalt at a polymer step 160. The blend and a mineral acid are then simultaneously added to a dilution asphalt at an acid step 170.

Referring now to FIG. 5, in a fifth method a neat asphalt undergoes a step of heating 180. A blend is then prepared by the addition of at least one polymer to the heated neat asphalt at a polymer step 190. The blend is then added to a dilution asphalt at a step 200. The resulting mixed combination is mixed at a step 210. A mineral acid is then added to this mixed combination at an acid step 220.

The asphalt that is Prized in any of the five above-discussed methods can be any suitable petroleum asphalt or asphaltic residue. It is very important to note that the blend asphalt and the dilution asphalt can be the same, slightly different, or completely different asphalts. In preferred embodiments, neat petroleum asphalts are utilized. Suitable neat asphalts can be based on sweet or sour crudes, heavy or light crudes, and aromatic or naphthenic crudes. In particularly preferred embodiments, for the sake of economy, heavy sour naphthenic crudes are utilized. A preferred source of heavy sour naphthenic crudes is Venezuela.

The acid that is utilized in any of the five above-discussed methods can be any suitable inorganic or organic acid. In preferred embodiments, minerals acids are utilized. Suitable mineral acids include sulfuric acid, nitric acid, hydrochloric acid and phosphoric acid. In particularly preferred embodiments, phosphoric acid in the form or polyphosphoric acid, or superphosphoric acid, is utilized. A preferred source of polyphosphoric acid is phospholeum.

The amount of acid used can be from approximately 0.05 wt % to approximately 5 wt %, preferably from approximately 0.1 wt % to approximately 2.0 wt %, based on the total weight of the resultant diluted product. In preferred embodiments, the amount of acid added is equal to approximately 0.4 wt %, based on the total weight of resultant diluted product.

The polymer that is utilized in any of the five above-discussed methods can be based on one or more suitable inorganic or organic polymers. In preferred embodiments, block copolymers of thermoplastic or thermosetting elastomers are utilized. Suitable elastomers include nylon, polyvinyl chloride, polyethylene (linear or crosslinked), polystyrene, polypropylene, fluorocarbon resins, polyurethane, acrylate resins, phenolics, alkyds, polyesters and ethylene-propylene-diene-monomers (EPDM). In particularly preferred embodiments, block copolymers in the form of styrene-butadiene-styrene (SBS) or styrene-butadiene rubber (SBR) are utilized.

The combination of the polymer and the asphalt into which it is mixed constitute a blend. If the weight percent of polymer to asphalt in this blend is from approximately 10 to approximately 20, the blend can be termed a concentrate.

EXAMPLES

Specific embodiments of the present invention will now be farther described by the following, nonlimiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Example 1 (prophetic)

A composition can be prepared by: providing a source of a neat asphalt based on a heavy sour naphthenic crude from Venezuela; heating the neat asphalt; providing hydrochloric acid as a source of mineral acid; adding the mineral acid to the neat asphalt, after the step of heating the neat asphalt; mixing the neat asphalt for a period of time of from approximately 1 hour to approximately 2 hours, after the step of adding the mineral acid; further heating the neat asphalt to a temperature of from approximately 325° F. to approximately 375° F., after the step of mixing the neat asphalt; providing SBR as a source of a polymer; adding the polymer to the neat asphalt in a weight ratio of approximately 1:10 to form a blend, after the step of further heating the neat asphalt; providing more heavy sour naphthenic crude from Venezuela as a source of a dilution asphalt; adding the blend to the dilution asphalt to form a diluted product; and mixing the diluted product. The hydrochloric acid can be added in an amount equal to approximately 0.4% by weight of said diluted product.

The method of this example can used as the basis for a process of preparing a paving material, wherein the diluted product is converted to the paving material, such as, for example, by adding an aggregate to the diluted product.

Example 2

Sample 2 was prepared by: providing a source of a neat asphalt based on a heavy sour naphthenic crude from Venezuela; heating the neat asphalt; providing a source of a polyphosphoric acid in the form of phospholeum; adding the polyphosphoric acid to the neat asphalt after the step of heating the neat asphalt; providing a source of a polymer in the form of an SBS block copolymer; adding the polymer to the neat asphalt to form a blend after the step of adding the polyphosphoric acid to the neat asphalt; providing more of the same heavy sour naphthenic crude from Venezuela as a source of a dilution asphalt; adding the blend to the dilution asphalt to form a diluted product; and mixing the diluted product. The polyphosphoric acid was added in an amount equal to approximately 0.4% by weight of the diluted product. The SBS block copolymer was added in an amount equal to approximately 3.0% by weight of the diluted product.

The method of this example can also used as the basis for a process of preparing a paving material, wherein the diluted product is converted to the paving material, such as, for example, by adding an aggregate to the diluted product.

For comparison, sample 1 was prepared by: providing a source of a neat asphalt based on the same heavy sour naphthenic crude from Venezuela; heating the neat asphalt; providing a source of a polymer; adding the polymer to the neat asphalt to form a blend; providing more of the same heavy sour naphthenic crude from Venezuela as a source of a dilution asphalt; adding the blend to the dilution asphalt to form a diluted product; and mixing the diluted product. The SBS polymer was added in an amount equal to approximately 3.0% by weight of the diluted product.

Example 3

Sample 3 was prepared by: providing a source of a neat asphalt based on the same heavy sour naphthenic crude from Venezuela; heating the neat asphalt; providing a source of a polymer in the form of an SBS copolymer; adding the polymer to the neat asphalt to form a blend after the step of heating the neat asphalt; providing more of the same heavy sour naphthenic crude from Venezuela as a source of a dilution asphalt; providing a source of a polyphosphoric acid; adding the polyphosphoric acid to the dilution asphalt; adding the blend to the dilution asphalt to form a diluted product after the step of adding the polyphosphoric acid to the dilution asphalt; and mixing the diluted product.

The polyphosphoric acid was added in an amount equal to approximately 0.4% by weight of said diluted product. The SBS block copolymer was added in an amount equal to approximately 3.0% by weight of the diluted product.

Again, the method of this example can used as the basis for a process of preparing a paving material, wherein the diluted product is converted to the paving material, such as, for example, by adding an aggregate to the diluted product.

Example 4

Sample 4 was prepared by: providing a source of a neat asphalt based on the same heavy sour naphthenic crude from Venezuela; heating the neat asphalt; providing a source of a polymer in the form of an SBS copolymer; adding the polymer to the neat asphalt to form a blend after the step of heating the neat asphalt; providing more of the same heavy sour naphthenic crude from Venezuela as a source of a dilution asphalt; providing a source of a polyphosphoric acid; adding both the blend and the polyphosphoric acid to the dilution asphalt simultaneously to form a diluted product; and mixing the diluted product.

The polyphosphoric acid was added in an amount equal to approximately 0.4% by weight of said diluted product. The SBS block copolymer was added in an amount equal to approximately 3.0% by weight of the diluted product.

Again, the method of this example can used as the basis for a process of preparing a paving material, wherein the diluted product is converted to the paving material, such as, for example, by adding an aggregate to the diluted product.

Example 5

Samples 5–6 were prepared by: providing a source of a neat asphalt based on the same heavy sour naphthenic crude from Venezuela; heating the neat asphalt; providing a source of a polymer in the form of an SBS copolymer; adding the polymer to the neat asphalt to form a blend after the step of heating the neat asphalt; providing more of the same heavy sour naphthenic crude from Venezuela as a source of a dilution asphalt; adding the blend to the dilution asphalt to form a diluted product; mixing the diluted product; providing a source of a polyphosphoric acid; and adding the polyphosphoric acid to the diluted product after the step of mixing the diluted product.

For samples 5–6, the polyphosphoric acid was added in an amount equal to approximately 0.4% by weight of said diluted product. The SBS block copolymer was added to sample 5 in an amount equal to approximately 3.0% by weight of the diluted product. The SBS block copolymer was added to samples 6 and 7 in an amount equal to approximately 3.5%, and approximately 5.0%, by weight of the diluted product, respectively.

Once again, the method of this example can used as the basis for a process of preparing a paving material, wherein the diluted product is converted to the paving material, such as, for example, by adding an aggregate to the diluted product.

For comparison, sample 7 was prepared by: providing a source of a neat asphalt based on the same heavy sour naphthenic crude from Venezuela; heating the neat asphalt; providing a source of a polymer in the form of an SBS copolymer; adding the polymer to the neat asphalt to form a blend after the step of heating the neat asphalt; providing more of the same heavy sour naphthenic crude from Venezuela as a source of a dilution asphalt; adding the blend to the dilution asphalt to form a diluted product; and mixing the diluted product.

Results

Referring to Table I, rotational viscometer (RV) and bending beam rheometer (BBR) data for the seven samples is presented. The RV data provides information on the binder properties of the samples at high temperatures. The BBR data provides information on the binder properties of the samples at low temperatures.

TABLE I

| | | Brookfield (cps) | | | BBR (S-MPa, m-unitless) | | | | | | |
|---|---|---|---|---|---|---|---|---|---|---|---|
| | | | 3000 max | | S @ −12° C. | m @ −12° C. | S @ −18° C. | m @ −18° C. | S @ −24° C. | m @ −24° C. | |
| | | @ 135° C. | @ 163° C. | @ 190° C. | 300 max | 0.300 min | 300 max | 0.300 min. | 300 max | 0.300 min. | Passing Grade |
| Sample 1 | 3% SBS; no acid | 1020 | 322 | 135 | 214.50 | 0.357 | 459.40 | 0.299 | | | 70-22 |
| Sample 2 | 3% SBS; 0.4% acid (added before SBS) | 1250 | 417 | 157 | 242.90 | 0.346 | | | 480.00 | 0.288 | 76-22 |
| Sample 3 | 3% SBS; 0.4% acid (added to dilution asphalt) | 1310 | 442 | 178 | 240.30 | 0.325 | 521.80 | 0.267 | | | 76-22 |
| Sample 4 | 3% SBS; 0.4% acid (added to sametime as concentrate) | 1280 | 430 | 175 | 251.00 | 0.334 | 476.40 | 0.255 | | | 76-22 |
| Sample 5 | 3% SBS; 0.4% acid (added after cure) | 1180 | 420 | 170 | 232.60 | 0.323 | 511.50 | 0.268 | | | 76-22 |
| Sample 6 | 3.5% SBS, 0.4% acid (added after cure) | 1560 | 490 | 195 | 227.90 | 0.332 | 508.00 | 0.269 | | | 82-22 |
| Sample 7 | 5% SBS; no acid | 1790 | 597 | 227 | 211.60 | 0.370 | 406.1 | 0.295 | | | 76-22 |

Referring now to Table II, dynamic shear rheometer (DSR) data for the seven samples is presented. The DSR data provides information on the binder properties of the samples at high and intermediate temperatures. test could not be run on sample 7 because the viscosity was too high for the test equipment. The Iatroscan analysis method covers the separation of the four fractions inherently present in all petroleum derived asphalt and asphaltic residual. The four fractions are asphaltenes, resins, cyclics, and saturates.

TABLE II

| | | G*/sin d (kPa) | | | | | | G*/sin d (MPa) | | | | | | |
|---|---|---|---|---|---|---|---|---|---|---|---|---|---|---|
| | | Original OSR 1.00 min. | | | RTFO DSR 2.20 min. | | | PAV DSR 5.00 max | | | | | | |
| | | % Loss 1.0 max | 70° C. | 76° C. | 82° C. | 70° C. | 76° C. | 82° C. | 34° C. | 31° C. | 28° C. | 25° C. | 22° C. | 19° C. | Passing Grade |
| Sample 1 | 3% SBS; no acid | | 1.806 | 0.989 | | 3.310 | 1.877 | | | | 2.474 | | 5.044 | | 70-22 |
| Sample 2 | 3% SBS; 0.4% acid (added before SBS) | | 2.989 | 1.580 | 0.877 | 6.815 | 3.170 | 1.864 | | 2.058 | | | 5.883 | | 76-22 |
| Sample 3 | 3% SBS; 0.4% acid (added to dilution asphalt) | | | 1.245 | 0.754 | | 3.485 | 1.834 | | 2.409 | 3.387 | 4.586 | 6.781 | | 76-22 |
| Sample 4 | 3% SBS; 0.4% acid (added at sametime as concentrate) | | | 1.334 | 0.774 | | 3.007 | 1.706 | | 2.081 | | | 6.138 | | 76-22 |
| Sample 5 | 3% SBS; 0.4% acid (added after cure) | | | 1.418 | 0.727 | | 3.283 | 1.697 | | 1.972 | | | 5.502 | | 76-22 |
| Sample 6 | 3.5% SBS, 0.4% acid (added after cure) | | | 2.146 | 1.115 | | 4.155 | 2.258 | 1.076 | | | | 4.070 | | 52-22 |
| Sample 7 | 5% SBS; no acid | 0.340 | | 1.915 | 1.209 | | 2.908 | 1.669 | | 1.038 | | | | 4.014 | 76-22 |

Referring now to Table III, a variety of mechanical performance data and some compositional (Iatroscan) data for the seven samples is presented. The absolute viscosity

TABLE III

| | | Abs. Vis., (P) | Kin. Vis, cSt | Pen. dmm | | Iatroscan Analysis % | | | | Ductility (cm) | | F. Duct. | Tensile S. | Soft. Pt. |
|---|---|---|---|---|---|---|---|---|---|---|---|---|---|---|
| | | 140° F. | 275° F. | 25° C. | Acid V. | A | R | C | S | 25° C. | 4° C. | $f_2/f_1$ | Kg/Cm$^2$ | ° F. |
| Sample 1 | 3% SBS; no acid | 6531 | 897.1 | 54 | 2.82 | 16 | 12 | 67.1 | 5.4 | 150+ | 19 | 0.25 | 1.200 | 129 |
| Sample 2 | 3% SBS; 0.4% acid (added before SBS) | 9,700 | 993.7 | 49 | 6.38 | 18 | 12 | 65.6 | 5.0 | 129 | 14 | 0.27 | 1.651 | 133 |
| Sample 3 | 3% SBS; 0.4% acid (added to dilution asphalt) | 44,511 | 1,496 | 46 | 7.25 | 15 | 14 | 65.4 | 5.6 | 150+ | 15 | 0.28 | 1.751 | 170 |

TABLE III-continued

| Sample 4 | 3% SBS; 0.4% acid (added at sametime as concentrate) | 15,235 | 1,205 | 44 | 7.42 | 18 | 10 | 65.9 | 6.1 | 111 | 15 | 0.35 | 1.059 | 153 |
| --- | --- | --- | --- | --- | --- | --- | --- | --- | --- | --- | --- | --- | --- | --- |
| Sample 5 | 3% SBS; 0.4% acid (added after cure) | 79,291 | 1,386 | 43 | 7.26 | 17 | 20 | 55.5 | 7.3 | 112 | 14 | 0.30 | 1.008 | 156 |
| Sample 6 | 3.5% SBS, 0.4% acid (added after cure) | 41,860 | 1,519 | 49 | 7.66 | 18 | 21 | 53.8 | 5.5 | 140 | 10 | 0.27 | 1.329 | 155 |
| Sample 7 | 5% SBS; no acid | — | 1,712 | 47 | 2.48 | 16 | 32 | 46.9 | 5.7 | 121 | 24 | 0.39 | 1.594 | 194 |

| | | Elastic Rec. 20 cm, 10° C. % | TFO, Elastic Rec. 77° F. % | Sep. Test T & B diff, ° F. % |
| --- | --- | --- | --- | --- |
| Sample 1 | 3% SBS; no acid | 68.75 | 70 | Over 48 |
| Sample 2 | 3% SBS; 0.4% acid (added before SBS) | 66.25 | 60 | over 40 |
| Sample 3 | 3% SBS; 0.4% acid (added to dilution asphalt) | 72.50 | 82.5 | over 56 |
| Sample 4 | 3% SBS; 0.4% acid (added at sametime as concentrate) | 72.50 | 50.0 | over 36 |
| Sample 5 | 3% SBS; 0.4% acid (added after cure) | 73.75 | 52.5 | over 45 |
| Sample 6 | 3.5% SBS, 0.4% acid (added after cure) | 68.75 | 82.5 | over 36 |
| Sample 7 | 5% SBS; no acid | 88.80 | 87.5 | over 74 |

Asphaltenes are black amorphous solids containing, in addition to carbon and hydrogen, some nitrogen, sulfur, and oxygen. Trace elements such as nickel and vanadium are also present. Asphaltenes are generally considered as highly polar aromatic materials of molecular weights of 2000–5000 (number average), and constitute 5–25% of the weight of asphalt.

Resins (polar aromatics) are dark-colored, solid and semi-solid, very adhesive fractions of relatively high molecular weight present in the maltenes. They are the dispersing agents of peptizers for the asphaltenes, and the proportion of resins to asphaltenes governs, to a degree, the sol-or gel-type character of asphalts. Resins separated from bitumens are found to have molecular weights of 800–2000 (number average) but there is a wide molecular distribution. This component constitutes 15–25% of the weight of asphalts.

Cyclics (naphthene aromatics) comprise the compounds of lowest molecular weight in bitumens and represent the major portion of the dispersion medium for the peptized asphaltenes. They constitute 45–60% by weight of the total asphalt and are dark viscous liquids. They are compounds with aromatic and naphthenic aromatic nuclei with side chain constituents and have molecular weights of 500–900 (number average).

Saturates comprise predominantly the straight-and branched-chain aliphatic hydrocarbons present in bitumens, together with alkyl naphthenes and some alkyl aromatics. The average molecular weight range is approximately similar to that of the cyclics, and the components include the waxy and non-waxy saturates. This fraction forms 5–20% of the weight of asphalts.

The sample to be tested is first deasphaltened to yield maltenes which is the heptane solution portion. This solution is then absorbed on 5 micron silica-gel, and fractionated by upward elution on silica-gel coated glass rods (Chromarods®) using specific solvent types, development methods and development duration. The three separated fractions are then burned from the chromarods using flame ionized detection (FID) and flame thermonic ionization detection systems. The FID system provides specific response to organic compounds, therefore three chromatographic fractions are thus separated and identified as polar aromatics, naphthene aromatics, and saturates, or resins, cyclics and saturates respectively. These, together with asphaltenes comprise the four generic fractions found in asphalt.

A practical application of the present invention which has value within the technological arts is road building. Further, all the disclosed embodiments of the present invention are useful in conjunction with compositions such as are used for the purpose of sealing, or for the purpose of water proofing, or the like. There are virtually innumerable uses for the present invention described herein, all of which need not be detailed here.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that, within the scope of the appended claims, the invention may be practiced otherwise than as specifically described herein.

For example, the performance of the composition could be enhanced by providing additional additives. As another example, although phospholeum is preferred as the source of polyphosphoric acid, any suitable phosphoric acid containing material, or precursor, could be used in its place. Similarly, although styrene-butadiene-styrene (SBS) and styrene-butadiene rubber (SBR) latex are preferred as the polymer additive, any suitable visco-elastic material could be used in their place. In addition, the individual steps involved in preparing the compositions need not be carried out in the disclosed sequence, but could be carried out in virtually any suitable sequence.

Moreover, although the composition described herein is a physically separate material, it will be manifest that the composition may be integrated into other materials with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. A composition suitable for use as a polymer modified asphalt, said composition being made by a plurality of steps, said plurality of steps comprising:
   providing a source of a neat asphalt;
   heating said neat asphalt;
   providing a source of a phosphoric acid;
   adding said acid to said neat asphalt, after the step of heating said neat asphalt;
   mixing said neat asphalt for a period of time of from approximately 1 hour to approximately 2 hours, after the step of adding said acid;
   further heating said neat asphalt to a temperature of from approximately 300° F. to approximately 400° F., after the step of mixing said neat asphalt;
   providing a source of a polymer;
   adding said polymer to said neat asphalt to form a blend, after the step of further heating said neat asphalt;
   providing a source of a dilution asphalt;
   adding said blend to said dilution asphalt to form a diluted product; and
   mixing said diluted product.

2. The composition of claim 1, wherein said temperature is from approximately 325° F. to approximately 375° F.

3. The composition of claim 1, wherein said blend is a concentrate that includes from approximately 10 wt. % to approximately 20 wt. % of said polymer.

4. The composition of claim 1, wherein said composition comprises from approximately 0.1% to approximately 1.0% by weight of said acid.

5. The composition of claim 4, wherein said acid includes a source of a polyphosphoric acid.

6. A composition suitable for use as a polymer modified asphalt, said composition being made by a plurality of steps, said plurality of steps comprising:
   providing a source of a neat asphalt;
   heating said neat asphalt;
   providing a source of a phosphoric acid;
   adding said acid to said neat asphalt after the step of heating said neat asphalt;
   providing a source of a polymer;
   adding said polymer to said neat asphalt to form a blend after the step of adding said acid to said neat asphalt;
   providing a source of a dilution asphalt;
   adding said blend to said dilution asphalt to form a diluted product; and
   mixing said diluted product.

7. The composition of claim 6, wherein said blend is a concentrate that includes from approximately 10 wt. % to approximately 20 wt. % of said polymer.

8. The composition of claim 6, wherein said composition comprises from approximately 0.1% to approximately 1.0% by weight of said acid.

9. The composition of claim 8, wherein said acid includes a source of a polyphosphoric acid.

10. A composition suitable for use as a polymer modified asphalt, said composition being made by a plurality of steps, said plurality of steps comprising:
    providing a source of a neat asphalt;
    heating said neat asphalt;
    providing a source of a polymer;
    adding said polymer to said neat asphalt to form a blend after the step of heating said neat asphalt;
    providing a source of a dilution asphalt;
    providing a source of a phosphoric acid;
    adding said acid to said dilution asphalt;
    adding said blend to said dilution asphalt to form a diluted product after the step of adding said acid to said dilution asphalt; and
    mixing said diluted product.

11. The composition of claim 10, wherein said blend is a concentrate that includes from approximately 10 wt. % to approximately 20 wt. % of said polymer.

12. The composition of claim 10, wherein said composition comprises from approximately 0.1% to approximately 1.0% by weight of said acid.

13. The composition of claim 12, wherein said acid includes a source of a polyphosphoric acid.

14. A composition suitable for use as a polymer modified asphalt, said composition being made by a plurality of steps, said plurality of steps comprising:
    providing a source of a neat asphalt;
    heating said neat asphalt;
    providing a source of a polymer;
    adding said polymer to said neat asphalt to form a blend after the step of heating said neat asphalt;
    providing a source of a dilution asphalt;
    providing a source of a phosphoric acid;
    adding both said blend and said acid to said dilution asphalt simultaneously to form a diluted product; and
    mixing said diluted product.

15. The composition of claim 14, wherein said blend is a concentrate that includes from approximately 10 wt. % to approximately 20 wt. % of said polymer.

16. The composition of claim 14, wherein said composition comprises from approximately 0.1 % to approximately 1.0% by weight of said acid.

17. The composition of claim 16, wherein said acid includes a source of a polyphosphoric acid.

18. A composition suitable for use as a polymer modified asphalt, said composition being made by a plurality of steps, said plurality of steps comprising:
    providing a source of a neat asphalt;
    heating said neat asphalt;
    providing a source of a polymer;
    adding said polymer to said neat asphalt to form a blend after the step of heating said neat asphalt;
    providing a source of a dilution asphalt;
    adding said blend to said dilution asphalt to form a diluted product;
    mixing said diluted product;
    providing a source of a phosphoric acid; and
    adding said acid to said diluted product after the step of mixing said diluted product.

19. The composition of claim 18, wherein said blend is a concentrate that includes from approximately 10 wt. % to approximately 20 wt. % of said polymer.

20. The composition of claim 18, wherein said composition comprises from approximately 0.1% to approximately 1.0% by weight of said acid.

21. The composition of claim 20, wherein said acid includes a source of a polyphosphoric acid.

22. A product made by a method of preparing a polymer modified asphalt comprising:
  providing a source of a neat asphalt;
  heating said neat asphalt;
  providing a source of a mineral acid;
  adding said mineral acid to said neat asphalt, after the step of heating said neat asphalt;
  mixing said neat asphalt for a period of time of from approximately 1 hour to approximately 2 hours, after the step of adding said mineral acid;
  further heating said neat asphalt to a temperature of from approximately 300° F. to approximately 400° F., after the step of mixing said neat asphalt;
  providing a source of a polymer;
  adding said polymer to said neat asphalt to form a blend, after the step of further heating said neat asphalt;
  providing a source of a dilution asphalt;
  adding said blend to said dilution asphalt to form a diluted product; and
  mixing said diluted product.

23. A product made by a method of preparing a polymer modified asphalt comprising:
  providing a source of a neat asphalt;
  heating said neat asphalt;
  providing a source of a polymer;
  adding said polymer to said neat asphalt to form a blend after the step of heating said neat asphalt;
  providing a source of a dilution asphalt;
  providing a source of a mineral acid;
  adding said mineral acid to said dilution asphalt;
  adding said blend to said dilution asphalt to form a diluted product after the step of adding said mineral acid to said dilution asphalt; and
  mixing said diluted product.

24. A product made by a method of preparing a polymer modified asphalt comprising:
  providing a source of a neat asphalt;
  heating said neat asphalt;
  providing a source of a polymer;
  adding said polymer to said neat asphalt to form a blend after the step of heating said neat asphalt;
  providing a source of a dilution asphalt;
  providing a source of a mineral acid;
  adding both said blend and said mineral acid to said dilution asphalt simultaneously to form a diluted product; and
  mixing said diluted product.

25. A product made by a method of preparing a polymer modified asphalt comprising:
  providing a source of a neat asphalt;
  heating said neat asphalt;
  providing a source of a polymer;
  adding said polymer to said neat asphalt to form a blend after the step of heating said neat asphalt;
  providing a source of a dilution asphalt;
  adding said blend to said dilution asphalt to form a diluted product;
  mixing said diluted product;
  providing a source of a mineral acid; and
  adding said mineral acid to said diluted product after the step of mixing said diluted product.

26. The composition of claim 4, wherein said composition comprises 0.4% by weight of said acid.

27. The composition of claim 8, wherein said composition comprises 0.4% by weight of said acid.

28. The composition of claim 12, wherein said composition comprises 0.4% by weight of said acid.

29. The composition of claim 16, wherein said composition comprises 0.4% by weight of said acid.

30. The composition of claim 20, wherein said composition comprises 0.4% by weight of said acid.

31. The composition of claim 1, wherein said blend is a concentrate that includes from approximately 3.0 wt % to approximately 3.5 wt % of said polymer.

32. The composition of claim 6, wherein said blend is a concentrate that includes from approximately 3.0 wt % to approximately 3.5 wt % of said polymer.

33. The composition of claim 10, wherein said blend is a concentrate that includes from approximately 3.0 wt % to approximately 3.5 wt % of said polymer.

34. The composition of claim 18, wherein said blend is a concentrate that includes from approximately 3.0 wt % to approximately 3.5 wt % of said polymer.

* * * * *